United States Patent Office 3,048,521
Patented Aug. 7, 1962

3,048,521
METHOD OF MANUFACTURING NUTRITIOUS ELEMENTS AND NUTRITIVE PREPARATIONS
Buheiji Fujimoto, 115 2-Chome, Kami-Ogikubo, Suginami-ku, Tokyo, Japan
No Drawing. Filed May 5, 1958, Ser. No. 732,800
Claims priority, application Japan May 17, 1957
6 Claims. (Cl. 167—74)

This invention relates to a method of manufacturing nutritious elements and nutritive preparations, more particularly utilizing the bone of so-called warm-blooded animals especially cattle.

The principal object of this invention is to utilize the effective ingredients of the bone of warm-blooded animals as nutritive elements for the human body in order to maintain or promote sound health.

Another object of this invention is to provide the most important nutritive preparations from almost valuless waste material at lower cost and in an easy manner.

The inventor, a doctor of medicine, has made studies on the bone tissue of the so-called warm-blooded animals for many years and has found the following facts:

(1) Such bones are not only supports of the body, but also are important tissues, wherein take place several vital functions, which exert influences upon the growth, metabolism and health of the body.

(2) The constitution of the bone may be enriched specifically by supplying ingredients of the bone of the so-called warm-blooded animals and its functions may be stimulated too.

(3) When bones are treated specifically with bone tissue, activities of all cells in the body may be thereby so stimulated that several distinguished clinical effects, that hitherto had never been observed, were perceived.

The inventor has ascertained as the results of analysis that bone of the so-called warm-blooded animals consists of the following ingredients.

Cattle | Percent
--- | ---
Water | 27
Fat | 17
Collagen | 3
Muco-polysaccharide | 10
Other organic matter | 5
Inorganic matter, phosphoric acid | 15
Calcium | 20
Others | 3

I. *Physiological Functions Which are Played in the Bone Tissue (Metabolism of Minerals)*

(1) Bone tissue as a repository of minerals: The bones contain a large quantity of minerals, which make bones strong and tough. 90% of total phosphoric acid content in the human body, 99% of total calcium and 71% of total magnesium exist in bones. These minerals in the bones are turning over incessantly, so they are in the state of dynamic equilibrium. Chewitz confirmed that $P^{32}$, which was administered to adult albi rats, was stored partly in their bones and that one third was in 20 days mobilized therefrom.

(2) Phosphoric acid is needed essentially for nourishment of cells in the body: Both plants and animals are composed of cells. Every part of cells, namely nucleus, mitochondria, microsome and Golgi's apparatus contains compounds of phosphoric acid. Energy rich adenosin-tri-phosphate, ATP, has 3 molecules of phosphoric acid.

(3) Bones as a repository of phosphoric acid: Phosphoric acid is one of the most important fertilizers for plants. Phosphoric acid is also one of the most useful nutriments for animals.

The reason, why the necessity of the phosphoric acid as a nutriment for animals is almost disregarded, is in the fact that the total amount of phosphoric acid in our daily food is never insufficient. But the supplying of phosphoric acid to cells is often insufficient, because the amount of phosphoric acid which is resorbed from food into blood during digestion is so excessive that the excess of phosphoric acid in the blood would be excreted in stool and urine, when the bone tissues were unable to store this excess.

The phosphoric acid stored in bone tissues is provided for increased requirements of the cells of the body when they are active.

The method of manufacturing preparations which stimulate the function of bone tissue specifically was found by the inventor.

II. *Physiological Functions Which Are Played in the Bone Tissue (Production of Collagen and Muco-polysaccharide)*

Remarkable amounts of collagen and muco-polysaccharide are found in bones as above mentioned. These are very important constituents to connect organs, tissues, cells and fibers with each other.

Elasticity of cartilages, bones, heart, blood vessels and tendons is kept by supplying these two sufficiently. Surface of articular capsules and nerve sheaths are kept always slippery by supplying muco-polysaccharide sufficiently.

III. *Function of the Bone Marrow*

Functions of the bone marrows are as follows:
(1) Creation of red blood corpuscles,
(2) Creation of white blood corpuscles.

IV. *A Method of Manufacturing Nutritive Preparations According to This Invention, Which Stimulate the Bone Tissue*

It was investigated what material is to be preferred to obtain the most effective preparations and what method is to be preferred to obtain preparations suitable for daily use.

The following facts were clarified by the inventor's investigation:

(1) The bone preparations which were prepared from the bone of the so-called warm-blooded animals were able to stimulate the bone tissue more specifically than that of the so-called cold-blooded animals.

(2) Among the constituents of the bone, muco-saccharide and nucleoproteide have specific affinity for the bone itself.

(3) Both muco-polysaccharide and nucleic acid of the bone are water soluble and heat resistant.

According to this invention special care was taken to obtain ingredients unchanged in its properties in a process of manufacturing nutritive elements and nutritive preparations. Fat of bones and bone marrow of the so-called warm blooded animals were removed by benzine or by high pressure steam, and the bone was then dried. The property of muco-polysaccharide and nucleic acid according to their specific affinity for bone tissue remain unchanged through these processes and no loss of the effective elements occurs. Moreover the dried bone is able to be ground to fine powder. Nuclease which decomposes nucleic acid through its fermentation is dissociated by heat or desiccation. The crusher and pulverizer are employed to make the bone powder as fine as possible. It contains also calcium phosphate, which may be absorbed easily from intestine and contribute to the formation of the bone tissue. Moreover this powder is in the state adapted for preservation over a long period.

To the above mentioned bone powder may be added vitamin $B_1$ or a supplier of vitamin $B_1$ and laminaria powder as a seasoning material and a supplier of iodine. Tablets were prepared from this mixture by means of a tablet machine.

These preparations exhibit remarkable effects upon the growth of albi rats' bones, as the following table shows.

Index of growth of bones of albi rats:
    Control _____ 100
    Calcium carbonate added _____ 109
    Bone preparation added _____ 173

The results of this experiment indicate that the bones of albi rats which were administered the bone preparation, were specifically stimulated and the growth of their bones was accelerated through it.

The inventor has succeeded in providing not only the method to prepare a nutritive preparation which consists mainly of the bone powder, but also to prepare a more effective preparation by adding an extract obtained from the bone powder to the previous preparation.

As above mentioned, fat of the bone was removed by benzine or by steam, at a pressure of 5 pounds for 2 hours. After drying, the bones were crushed and ground to a fine powder. To this bone powder was added about ten times as much water. The mixture was heated and stirred for 24 hours and then the water extract was condensed by evaporating water. The extract thus obtained contains crude muco-polysaccharide and crude nucleic acid. By adding this extract to said preparation of the bone powder in any ratio, one can obtain preparations, which contain crude muco-polysaccharide and crude nucleic acid in desired percent.

Pure muco-polysaccharide of the bone may be obtained as a precipitate, when the above mentioned water extract of bone is poured, little by little, into about 10–15 times quantity of absolute alcohol or methylalcohol, while nucleic acid of the bone cells remains dissolved in alcohol or methylalcohol. Muco-polysaccharide in pure state may be obtained by repeating the precipitation in absolute alcohol.

The following examples show several manners of manufacturing the preparation of this invention and its test results.

EXAMPLE I

Bones of the so-called warm-blooded animals, for example cattle, fowl etc. are crushed into adequate pieces. Then the fat of the bones is removed by subjecting them to high pressure steam for 2 hours in an autoclave, or by soaking in benzine for 24 hours. By steaming, collagen in the bone tissue also can be removed. Then the bones are desiccated to a high degree of dryness. The prepared bones are made so brittle that they may be easily pulverized to fine powder. The ferment like nucrease, which destroys useful nucleic acid and protein in the bone tissue at blood temperature, are dissociated by high heat of steam or desiccation.

Desiccated bones are crushed into pieces by means of a crusher and then pulverized to fine powder, such as 100 mesh at least by means of a pulverizer.

Bone powder thus prepared contains nucleic acid, nucleoproteid and muco-polysaccharide (c. 20%) which stimulate specifically the bone tissue of animals. It contains also phosphatide, phosphoproteide, calcium phosphate (c. 60%), calcium carbonate (c. 6%), which are constituents of bone tissue.

An effective preparation may be obtained by adding to the bone powder (69.8%) the following 3 substances, namely a supplier of vitamin $B_1$ 20%, calcium carbonate 10% and laminaria 0.2%. Thereby vitamin $B_1$, $B_2$ and iodine are supplemented to the preparation.

The index of growth of bones of albi rats which were administered this preparation was 173%, namely a large increase of 73%, compared with the controls.

EXAMPLE II

To the powder of bone tissue obtained by the process as described in Example I, was added 10 times as much quantity of water. The mixture was stirred continuously for 24 hours and then the water extract was condensed. This extract contains crude muco-polysaccharide and crude nucleic acid. By adding this extract the above mentioned bone powder in the following ratio, one obtains more efficient preparations which show the same effect as Example I upon the growth of albi rat bone even in less dosage.

Percent
(1) Crude muco-polysaccharide and crude
    nucleic acid _____ 25
    Bone powder _____ 75

(2) Crude muco-polysaccharide and crude
    nucleic acid _____ 40
    Calcium phosphate _____ 60

(3) Crude muco-polysaccharide and crude
    nucleic acid _____ 25
    Bone powder _____ 74.9
    Vitamin $B_1$ _____ 0.1

(4) Crude muco-polysaccharide and crude
    nucleic acid _____ 40
    Calcium phosphate _____ 59.9
    Vitamin $B_1$ _____ 0.1
    Vitamin D (in ratio daily 400 I.U.).

EXAMPLE III

The said water extract which contains crude muco-polysaccharide and crude nucleic acid is dissolved in water, and poured into 10–15 times quantity of absolute alcohol or methylalcohol, then pure muco-polysaccharide may be precipitated easily. By adding this precipitate to above mentioned bone powder or calcium phosphate, one can obtain a more efficient preparation than that obtained in the preceding example. The growth of bones of albi rats which received this preparation was the same as in case of Example I, but in less dosage.

What I claim is:

1. A method of manufacturing nutritious preparations which comprise heating untreated fresh bones containing marrow of warm-blooded animals in an autoclave with steam thereby removing fats and collagen from said bones, drying the bones thus treated as perfectly as possible to render them easily crushable, pulverizing the dried bones into a fine powder, agitating the bone powder with water to extract water-soluble ingredients therefrom, evaporating the water from the extract to obtain a dry mixture of muco-polysaccharide and nucleic acid, and mixing a portion of said fine bone powder with said muco-polysaccharide and nucleic acid.

2. A method according to claim 1 which further comprises mixing crude muco-polysaccharide and crude nucleic acid obtained by evaporating the water extract with a precipitating liquid selected from the group consisting of methanol and absolute ethyl alcohol to precipitate substantially pure muco-polysaccharide and substantially pure nucleic acid, separating the precipitate from the liquid, and adding the substantially pure muco-polysaccharides and nucleic acid to a portion of said bone powder.

3. A method according to claim 1 in which said steam is high pressure steam.

4. A nutritive product according to the process of claim 1.

5. A nutritive product according to the process of claim 1 plus vitamins.

6. A nutritive product according to the process of claim 2.

(References on following page)

References Cited in the file of this patent

UNITED STATES PATENTS

| | | |
|---|---|---|
| 2,218,592 | Taylor | Oct. 22, 1940 |
| 2,395,900 | Mueller | Mar. 5, 1946 |
| 2,622,028 | Orr | Dec. 16, 1952 |
| 2,635,104 | Chayen | Apr. 14, 1953 |
| 2,680,075 | Landan | June 1, 1954 |

OTHER REFERENCES

Chem. Abst., vol. 15 (1921), page 1171.

Kraus: Chem. Abst., vol. 12, (1918), page 1572.

Hartley: J. Mount Sinai Hospital, vol. 15, March-April 1949, pages 383–387.

Sylven: J. Bone and Joint Surgery, vol. 29, No. 3, July 1947, pages 745–752.

U.S. Dispensatory, 25th edition, 1955, Lippincott Co., Philadelphia, Pennsylvania, pages 598 to 600.